(12) United States Patent
Matsuta

(10) Patent No.: US 12,068,485 B2
(45) Date of Patent: Aug. 20, 2024

(54) SECONDARY BATTERY

(71) Applicant: Panasonic Intellectual Property Management Co., Ltd., Osaka (JP)

(72) Inventor: Shigeki Matsuta, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 636 days.

(21) Appl. No.: 17/283,659

(22) PCT Filed: Oct. 10, 2019

(86) PCT No.: PCT/JP2019/040061
§ 371 (c)(1),
(2) Date: Apr. 8, 2021

(87) PCT Pub. No.: WO2020/090410
PCT Pub. Date: May 7, 2020

(65) Prior Publication Data
US 2022/0013789 A1    Jan. 13, 2022

(30) Foreign Application Priority Data
Oct. 30, 2018   (JP) .................. 2018-204327

(51) Int. Cl.
*H01M 4/66*     (2006.01)
*H01M 4/525*    (2010.01)
(Continued)

(52) U.S. Cl.
CPC ........... *H01M 4/666* (2013.01); *H01M 4/525* (2013.01); *H01M 4/667* (2013.01);
(Continued)

(58) Field of Classification Search
CPC ........ H01M 4/36; H01M 4/666; H01M 4/667; H01M 4/525; H01M 4/131
(Continued)

(56) References Cited

U.S. PATENT DOCUMENTS

| 2011/0039140 A1 | 2/2011 | Miyahisa et al. |
| 2011/0111291 A1 | 5/2011 | Koga |

(Continued)

FOREIGN PATENT DOCUMENTS

| CN | 108475772 A | 8/2018 |
| EP | 3396744 A4 | 12/2018 |

(Continued)

OTHER PUBLICATIONS

International Search Report dated Dec. 17, 2019, issued in counterpart Application No. PCT/JP2019/040061. (2 pages).
(Continued)

*Primary Examiner* — James M Erwin
*Assistant Examiner* — John S Medley
(74) *Attorney, Agent, or Firm* — WHDA, LLP

(57) ABSTRACT

Provided is a secondary battery that can sufficiently suppress a leakage current even when conductive foreign matter passes through a separator to cause a minute short-circuit. The secondary battery according to an aspect of the present disclosure comprises: a positive electrode; a negative electrode; and a separator interposed between the positive electrode and the negative electrode, wherein each of the positive electrode and the negative electrode has a current collector and a mixed material layer formed on the surface of the current collector. At least one of the positive electrode and the negative electrode has a semiconductor layer formed substantially over the entire surface of the mixed material layer and having a higher resistance than the mixed material layer.

5 Claims, 2 Drawing Sheets

(51) Int. Cl.
*H01M 10/0525* (2010.01)
*H01M 50/46* (2021.01)
*H01M 4/131* (2010.01)

(52) U.S. Cl.
CPC ....... *H01M 10/0525* (2013.01); *H01M 50/46* (2021.01); *H01M 4/131* (2013.01)

(58) Field of Classification Search
USPC .......................................... 429/209
See application file for complete search history.

(56) References Cited

U.S. PATENT DOCUMENTS

| | | | | |
|---|---|---|---|---|
| 2012/0100430 | A1* | 4/2012 | Park | H01M 4/485 977/773 |
| 2014/0227578 | A1 | 8/2014 | Yoshida | |
| 2014/0227606 | A1 | 8/2014 | Suzuki et al. | |
| 2017/0077493 | A1* | 3/2017 | Sasaki | H01M 4/0471 |
| 2017/0358816 | A1 | 12/2017 | Sugiura | |
| 2019/0036154 | A1* | 1/2019 | Kim | H01M 4/131 |
| 2020/0295362 | A1* | 9/2020 | Lee | H01M 4/366 |

FOREIGN PATENT DOCUMENTS

| | | | |
|---|---|---|---|
| EP | 3573146 A1 | 11/2019 | |
| EP | 3598561 A1 | 1/2020 | |
| JP | 2012-195224 A | 10/2012 | |
| JP | 5838042 B2 | 12/2015 | |
| JP | 2017-224402 A | 12/2017 | |
| WO | 2002/095849 A2 | 11/2002 | |
| WO | 2012/157119 A1 | 11/2012 | |
| WO | 2013/046443 A1 | 4/2013 | |
| WO | WO-2015162838 A1 * | 10/2015 | ............. H01M 4/36 |
| WO | 2016/038440 A1 | 3/2016 | |
| WO | 2018/097562 A1 | 5/2018 | |
| WO | 2018/168075 A1 | 9/2018 | |

OTHER PUBLICATIONS

The Extended European Search Report dated Nov. 18, 2021, issued in counterpart EP Application No. 19878544.6. (10 pages).
English Translation of Chinese Search Report dated Nov. 14, 2023, issued in counterpart CN application No. 201980051767.8. (3 pages).

* cited by examiner

SECONDARY BATTERY

TECHNICAL FIELD

The present disclosure relates to a secondary battery.

BACKGROUND ART

Conventionally, known is a secondary battery comprising an electrode assembly having a positive electrode, a negative electrode, and a separator interposed between the positive electrode and the negative electrode. For example, the lithium-ion battery disclosed in Patent Literature 1 has a semiconductive layer on the surface of the separator to allow the release of excess stored electrical energy when overcharged.

CITATION LIST

Patent Literature

PATENT LITERATURE 1: Japanese Patent No. 5838042

SUMMARY

In a secondary battery, a small short circuit may occur when a conductive foreign substance is mixed in the electrode assembly and the foreign substance penetrates the separator. In secondary batteries, it is an important issue to suppress leakage current (discharge) when a short circuit occurs, and the technique disclosed in Patent Literature 1 still has room for improvement in terms of suppressing leakage current.

The secondary battery according to one aspect of the present disclosure comprises a positive electrode, a negative electrode, and a separator interposed between the positive electrode and the negative electrode, and each of the positive electrode and the negative electrode has a current collector and a mixture layer formed on the surface of the current collector. At least one of the positive electrode and the negative electrode has a semiconductor layer that is formed on substantially the entire surface of the above mixture layer and that has a resistance larger than that of the mixture layer.

Advantageous Effects of Invention

According to the secondary battery of the present disclosure, leakage current can be sufficiently suppressed even when a conductive foreign substance penetrates the separator to cause a small short circuit.

DESCRIPTION OF EMBODIMENTS

In a secondary battery such as a lithium ion battery, it is an important issue to suppress the occurrence of a short circuit that causes a large leakage current. The present inventors have succeeded in suppressing such a short circuit by forming a semiconductor layer having a resistance larger than that of the mixture layer on substantially the entire surface of at least one of a positive electrode mixture layer and a negative electrode mixture layer. When the positive electrode and the negative electrode come into contact with each other through a conductive foreign substance, a semiconductor layer having a higher resistance than the mixture layer exists on the surface of the electrode, thereby allowing sufficient suppression of the leakage current and reduction of the reaction unevenness on the electrode surface due to the short circuit.

Hereinafter, an example of the embodiment of a secondary battery according to the present disclosure will be described in detail with reference to the drawings. In the following, the embodiment in which the semiconductor layer is formed on substantially the entire surface of the positive electrode mixture layer will be exemplified, and the semiconductor layer may be formed on substantially the entire surface of the negative electrode mixture layer, or may be formed on both the surface of the positive electrode mixture layer and the surface of the negative electrode mixture layer.

In addition, hereinafter, a cylindrical battery in which a wound electrode body 14 is housed in a cylindrical battery case is exemplified, and the electrode assembly is not limited to the wound type, and may be a laminate in which a plurality of positive electrodes and a plurality of negative electrodes are alternately laminated one by one via a separator. In addition, the secondary battery according to the present disclosure may be a rectangular battery having a rectangular metal case, a coin battery having a coin-shaped metal case, or the like, and a laminated battery including an exterior body being composed of a laminate sheet including a metal layer and a resin layer.

Figure 1:
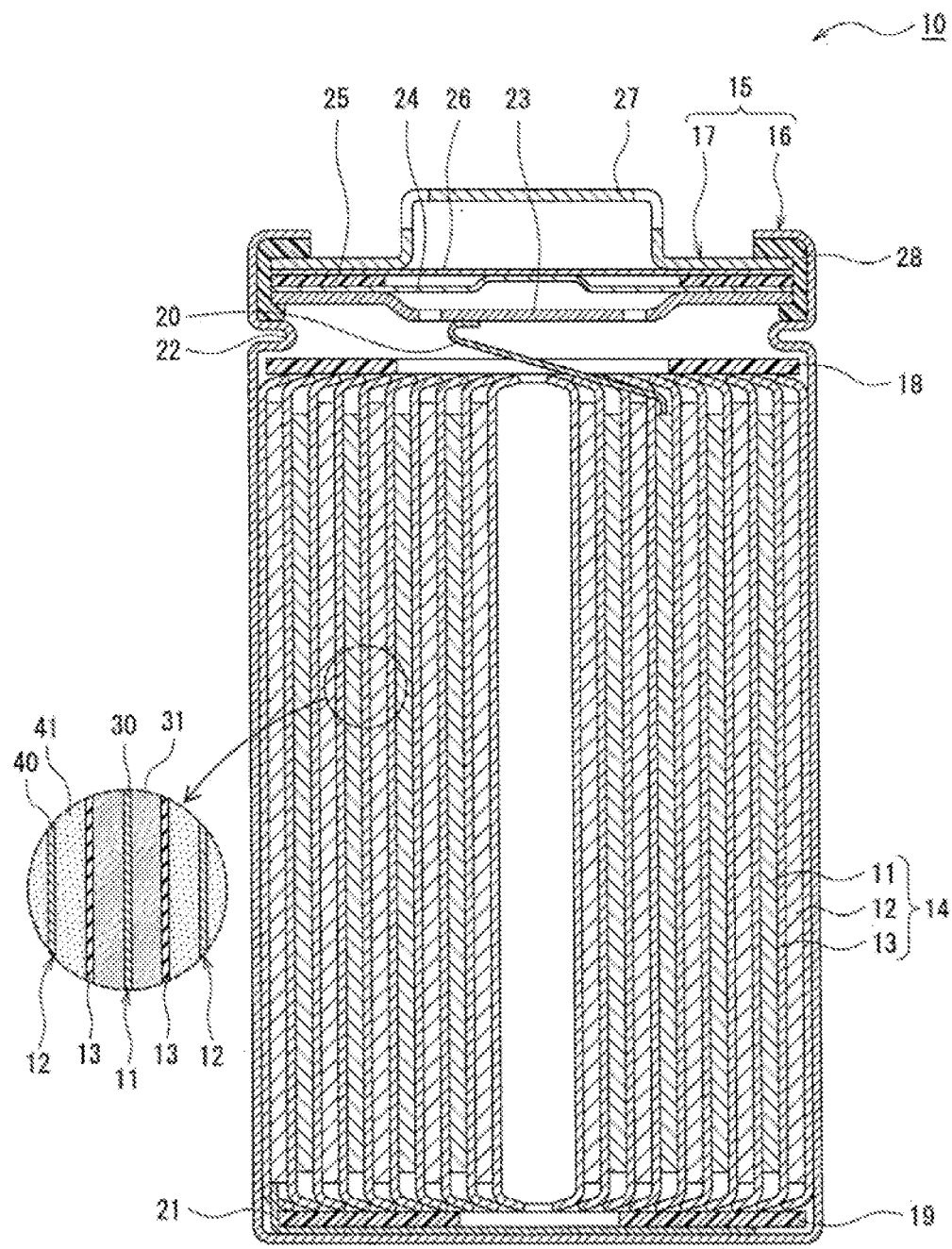
FIG. 1 is a vertical sectional view of a secondary battery according to an example of the embodiment.

FIG. 1 is a sectional view of a secondary battery 10 according to an example of the embodiment. As illustrated in FIG. 1, the secondary battery 10 includes an electrode assembly 14, a electrolyte, and a battery case 15 that houses the electrode assembly 14 and the electrolyte. The electrode assembly 14 includes a positive electrode 11, a negative electrode 12, and a separator 13, and has a wound structure in which the positive electrode 11 and the negative electrode 12 are wound via the separator 13. A battery case 15 is composed of a bottomed cylindrical exterior can 16 and a sealing assembly 17 that closes the opening of the exterior can 16. The secondary battery 10 may be a secondary battery using an aqueous electrolyte, or may be a secondary battery using a non-aqueous electrolyte. Hereinafter, the secondary battery 10 will be described as a non-aqueous electrolyte secondary battery such as a lithium ion battery using a non-aqueous electrolyte.

A non-aqueous electrolyte includes a non-aqueous solvent and an electrolyte salt dissolved in the non-aqueous solvent. For example, esters, ethers, nitriles, amides, and a mixed solvent of two or more thereof may be used as the non-aqueous solvent. The non-aqueous solvent may contain a halogen substitute in which at least a part of hydrogen of these solvents is substituted with a halogen atom such as fluorine. The non-aqueous electrolyte is not limited to a liquid electrolyte, and maybe a solid electrolyte. For example, a lithium salt such as $LiPF_6$ is used as the electrolyte salt.

The secondary battery 10 includes insulating plates 18 and 19 arranged above and below the electrode assembly 14, respectively. In the example shown in FIG. 1, a positive electrode lead 20 attached to the positive electrode 11 extends to the side of the sealing assembly 17 through the through hole of the insulating plate 18, and a negative electrode lead 21 attached to the negative electrode 12 extends to the bottom side of the exterior can 16 through the outside of the insulating plate 19. The positive electrode lead is connected to the lower surface of a bottom plate 23 of the sealing assembly 17, by welding or the like, and a cap 27, which is a top plate of the sealing assembly 17 electrically connected to the bottom plate 23, serves as a positive electrode terminal. The negative electrode lead 21 is connected to the inner surface of bottom of the exterior can 16 by welding or the like, and the exterior can 16 serves as a negative electrode terminal.

The exterior can 16 is, for example, a metal container with a bottomed cylindrical shape. A gasket 28 is provided between the exterior can 16 and the sealing assembly 17 to ensure the sealability inside the battery. The exterior can 16 has, for example, a projecting portion 22 for supporting the sealing assembly 17, in which a part of the side surface of the exterior can 16 protrudes inward. The projecting portion 22 is preferably formed in an annular shape along the circumferential direction of the exterior can 16, and the sealing assembly 17 is supported on the upper surface thereof.

The sealing assembly 17 has a structure in which a bottom plate 23, a lower vent member 24, an insulating member 25, an upper vent member 26, and a cap 27 are laminated in this order from the electrode assembly 14 side. Each member constituting the sealing assembly 17 has a disk shape or ring shape, for example, and each member except the insulating member 25 is electrically connected each other. The lower vent member 24 and the upper vent member 26 are connected together at their respective central portions, and the insulating member 25 is interposed between the respective peripheral portions. When the internal pressure of the battery rises due to abnormal heat generation, the lower vent member 24 is deformed and broken so as to push the upper vent member 26 toward the cap 27 side, and the current path between the lower vent member 24 and the upper vent member 26 is blocked. When the internal pressure further rises, the upper vent member 26 is broken and gas is discharged from the opening of the cap 27.

Hereinafter, the positive electrode 11, the negative electrode 12, and the separator 13 constituting the electrode assembly 14, particularly the positive electrode 11 will be described in detail.

Positive Electrode

Figure 2:
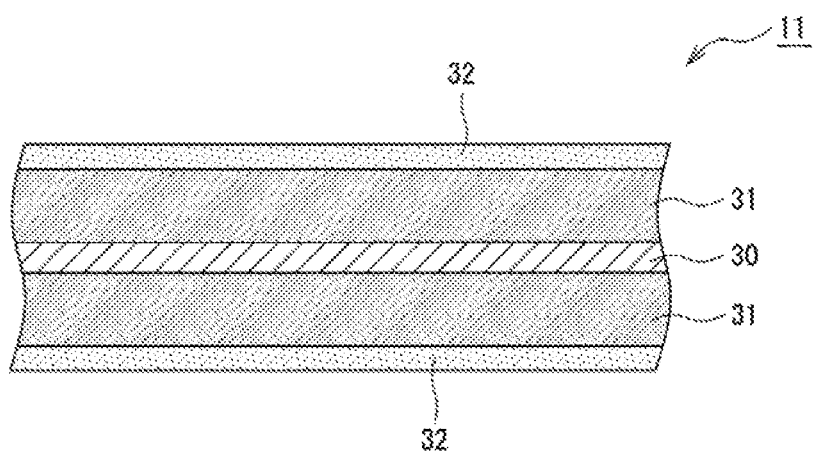
FIG. 2 is a sectional view of a positive electrode of a secondary battery according to an example of the embodiment.

FIG. 2 is a sectional view of the positive electrode 11 according to an example of the embodiment. The positive electrode 11 comprises a positive electrode current collector 30, a positive electrode mixture layer 31 formed on at least one surface of the positive electrode current collector 30, and a positive electrode semiconductor layer 32 formed on substantially the entire surface of the positive electrode mixture layer 31. The positive electrode mixture layer 31 is preferably formed on both sides of the positive electrode current collector 30, from the viewpoint of increasing the capacity of the positive electrode. The positive electrode semiconductor layer 32 is formed on the surface of each of the positive electrode mixture layers 31.

A foil of a metal stable in the potential range of the positive electrode 11 in the operating voltage range of the non-aqueous electrolyte secondary battery such as aluminum or aluminum alloy, a film in which the metal is disposed on the surface, or the like can be used as the positive electrode current collector 30. The preferable positive electrode current collector 30 is a metal foil consisting of aluminum or an aluminum alloy and has a thickness of 5 µm to 20 µm. The positive electrode mixture layer 31 includes a positive electrode active material, a binder, and a conductive agent. The thickness of the positive electrode mixture layer 31 is, for example, 30 µm to 120 µm, preferably 50 µm to 90 µm on one side of the positive electrode current collector 30.

A lithium-containing metal composite oxide containing transition metal elements such as Co, Mn, and Ni is used as the positive electrode active material included in the positive electrode mixture layer 31. Examples of the lithium-containing metal composite oxide include $Li_xCoO_2$, $Li_xNiO_2$, $Li_xMnO_2$, $Li_xCo_yNi_{1-y}O_2$, $Li_xCo_yM_{1-y}O_z$, $Li_xNi_{1-y}M_yO_z$, $Li_xMn_2O_4$, $Li_xMn_{2-y}M_yO_4$, $LiMPO_4$, and $Li_2MPO_4F$ (M: at least one of the group consisting of Na, Mg, Sc, Y, Mn, Fe, Co, Ni, Cu, Zn, Al, Cr, Pb, Sb, and B, $0<x\leq1.2$, $0<y\leq0.9$, $2.05\leq z\leq2.3$). These may be used singly or in combination of two or more.

Examples of the binder included in the positive electrode mixture layer 31 include fluorine resins such as polytetrafluoroethylene (PTFE) and polyvinylidene fluoride (PVdF), polyacrylonitrile (PAN), polyimide resins, acrylic resins, and polyolefin resins. In addition, these resins may be used in combination with carboxymethylcellulose (CMC) or a salt thereof, or polyethylene oxide (PEO). Examples of the conductive agent included in the positive electrode mixture layer 31 include carbon materials such as carbon black (CB), acetylene black (AB), ketjen black, and graphite. These may be used singly or in combination of two or more.

The positive electrode semiconductor layer 32 is a surface layer having a larger resistance than the positive electrode mixture layer 31, and is formed on the outermost surface of the positive electrode 11. Providing the positive electrode semiconductor layer 32 can increase the surface resistance of the positive electrode 11 to effectively suppress the occurrence of a short circuit that causes a large leakage current. The magnitude of the leakage current of the short circuit is determined by the resistance value of the short circuit, and the resistance value of the short circuit is affected by the resistance values of each of the mixture layer and the positive electrode semiconductor layer 32 between the positive electrode current collector 30 and the negative electrode current collector 40. Forming the positive electrode semiconductor layer 32 on the surface of the positive electrode mixture layer 31 can increase the resistance value of the short circuit to suppress the leakage current.

The resistance value of the positive electrode semiconductor layer 32 is preferably 1.5 times or more the resistance value of the positive electrode mixture layer 31. When the positive electrode semiconductor layer 32 includes a positive electrode active material, this resistance value is more preferably 2 to 10 times and, for example, 15Ω to 1000Ω in order to allow using the active material of the semiconductor layer for charge and discharge. On the other hand, when the positive electrode semiconductor layer 32 includes no positive electrode active material, the resistance value is, for example, 15Ω to 100000Ω since the positive electrode semiconductor layer 32 is not used for charge and discharge. The resistance values of the positive electrode mixture layer 31 and the positive electrode semiconductor layer 32 including the positive electrode mixture layer 31 can be measured by the two-terminal method (refer to Examples described below for a detailed measurement method).

As described above, the positive electrode semiconductor layer 32 is formed on substantially the entire surface of the positive electrode mixture layer 31. It is not possible to predict any spot on the positive electrode 11 at which a small short circuit will occur and therefore the positive electrode semiconductor layer 32 is formed on substantially the entire surface of the positive electrode mixture layer 31, thereby allowing effective suppression of the occurrence of a short circuit that causes a large leakage current. The positive electrode semiconductor layer 32 may be formed so as to protrude from the surface of the positive electrode mixture layer 31. That is, the positive electrode semiconductor layer 32 may be formed on the surface of the positive electrode current collector 30 so as not only to cover the entire surface of the positive electrode mixture layer 31 but also to have a larger area than the positive electrode mixture layer 31. For example, in the exposed portion where the surface of the positive electrode current collector 30 is exposed, and to which a positive electrode lead 20 is connected, the positive electrode semiconductor layer 32 may be formed directly on the surface of the positive electrode current collector 30.

In addition, the positive electrode semiconductor layer 32 may be formed on substantially the entire surface of the positive electrode mixture layer 31, and there may be a spot where the positive electrode semiconductor layer 32 is not formed as long as the object of the present disclosure is not impaired. In the present description, the term "substantially the entire surface of the positive electrode mixture layer 31" includes a case where it is recognized as essentially the entire surface as well as completely the entire surface. The positive electrode semiconductor layer 32 is formed in a region of 95% or more of the surface of the positive electrode mixture layer 31, preferably in an essentially 100% region.

The positive electrode semiconductor layer 32 includes, for example, at least one selected from the group consisting of oxides, nitrides, carbides, and positive electrode active materials. The positive electrode semiconductor layer 32 is preferably composed of at least one selected from the group consisting of oxides, nitrides, carbides, and positive electrode active materials as a main component. The main component is the component included most in the components of the positive electrode semiconductor layer 32. The content of at least one selected from the group consisting of oxides, nitrides, carbides, and positive electrode active materials is, for example, 80% by mass to 98% by mass with respect to the total mass of the positive electrode semiconductor layer 32. The positive electrode semiconductor layer 32 may include an oxide, a nitride, or a carbide containing at least one selected from the group consisting of Si, Al, Cr, Zr, Ta, Ti, Mn, Mg, and Zn.

The positive electrode semiconductor layer 32 is preferably composed of the positive electrode active material as a main component. Using the positive electrode active material for the positive electrode semiconductor layer 32 can suppress the occurrence of a short circuit that causes a large leakage current while suppressing the decrease in the battery capacity per volume. A lithium-containing metal composite oxide containing a transition metal element such as Co, Mn, or Ni can be used as the positive electrode active material included in the positive electrode semiconductor layer 32, as in the case of the positive electrode mixture layer 31. The positive electrode active material included in the positive electrode semiconductor layer 32 may be the same as or different from the positive electrode active material included in the positive electrode mixture layer 31. The positive electrode mixture layer 31 and the positive electrode semiconductor layer 32 include, for example, the same positive electrode active material. In this case, the content of the positive electrode active material in the positive electrode semiconductor layer 32 is higher than the content of the positive electrode active material in the positive electrode mixture layer 31.

The positive electrode semiconductor layer 32 preferably further includes a binder and a conductive agent. Using the binder improves the film strength of the positive electrode semiconductor layer 32. In addition, using the conductive agent easily adjusts the resistance value of the positive electrode semiconductor layer 32. Preferably, the resistance value of the positive electrode semiconductor layer 32 is controlled within a range in which the semiconductor layer can be counted as the positive electrode capacity and the occurrence of the above short circuit can be sufficiently suppressed. The binder and the conductive agent included in the positive electrode semiconductor layer 32 may be the same as or different from the binder and the conductive agent included in the positive electrode mixture layer 31. The positive electrode semiconductor layer 32 includes a binder such as polyvinylidene fluoride (PVdF) and a conductive agent such as acetylene black (AB), as in the case of the positive electrode mixture layer 31.

The content of the conductive agent in the positive electrode semiconductor layer 32 is preferably lower than the content of the conductive agent in the positive electrode mixture layer 31. The resistance values of the positive electrode semiconductor layer 32 and the positive electrode mixture layer 31 greatly change depending on the content of the conductive agent and therefore the content of the conductive agent in the positive electrode semiconductor layer 32 is lower than the content of the conductive agent in the positive electrode mixture layer 31, thereby allowing increase in the resistance value of the positive electrode semiconductor layer 32 while maintaining sufficient conductivity of the positive electrode mixture layer 31. From the viewpoint that it is easy to prepare a slurry of the positive electrode semiconductor layer 32 containing the conductive agent that is same in the positive electrode semiconductor layer 32 and in the positive electrode mixture layer 31, more preferably the constituent materials of the positive electrode mixture layer 31 and the positive electrode semiconductor layer 32 are the same, and the resistance value is adjusted by making the content of the conductive agent in the positive electrode semiconductor layer 32 smaller than that in the positive electrode mixture layer 31.

The positive electrode semiconductor layer 32 includes a conductive agent, and therefore can be counted as the positive electrode capacity. The size of the outer can 16 is standard, and therefore the thickness of the positive electrode 11 is limited. A trade-off relationship is established between the positive electrode mixture layer 31 and the positive electrode semiconductor layer 32 within the allowable thickness range of the positive electrode 11, and thus, for example, a leakage current due to a small short circuit can be suppressed when the positive electrode semiconductor layer 32 is an insulating layer, but the insulating layer cannot contribute to the capacity, reducing the capacity corresponding to the thickness of the positive electrode semiconductor layer 32. Adding a conductive agent to the positive electrode semiconductor layer 32 can increase the capacity while suppressing a leakage current due to a small short circuit.

The thickness of the positive electrode semiconductor layer 32 is thinner than the thickness of the positive electrode mixture layer 31, for example, 0.5 µm to 60 µm, and preferably 1 µm to 20 µm. When the thickness of the positive electrode semiconductor layer 32 is within this range, reducing the resistance value of the minute short circuit can suppress a leakage current within an allowable range. The ratio of the thickness of the positive electrode mixture layer 31 to the positive electrode semiconductor layer 32 is preferably 5:5 to 9.5:0.5, and more preferably 8:2 to 9.5:0.5, from the viewpoint of both positive electrode capacity and short-circuit suppression.

The positive electrode 11 is produced by using, for example, a positive electrode mixture slurry and a slurry for the positive electrode semiconductor layer. Specifically, the positive electrode mixture slurry is applied on both sides of the positive electrode current collector 30 and the coating film is dried to form the positive electrode mixture layer 31, and then a slurry for the positive electrode semiconductor layer is applied on substantially the entire surface of the positive electrode mixture layer 31, and the coating film is dried to form the positive electrode semiconductor layer 32. Thereafter, the positive electrode mixture layer 31 and the positive electrode semiconductor layer 32 are compressed by using a roller or the like. Each slurry includes a positive electrode active material, a binder, and a conductive agent. However, the amount of the conductive agent added is larger in the positive electrode mixture slurry than in the slurry for the positive electrode semiconductor layer.

Negative Electrode

The negative electrode 12 comprises a negative electrode current collector 40 and a negative electrode mixture layer 41 formed on at least one surface of the negative electrode current collector 40. A foil of a metal stable in the potential range of the negative electrode 12 in the operating voltage range of the non-aqueous electrolyte secondary battery such as copper or copper alloy, a film in which the metal is disposed on the surface, or the like can be used as the negative electrode current collector 40. Preferably, the negative electrode mixture layer 41 includes a negative electrode active material and a binder, and is formed on both sides of the negative electrode current collector 40. The negative electrode 12 can be produced by applying a negative electrode mixture slurry including a negative electrode active material and a binder or the like on the surface of the negative electrode current collector 40, drying the coating film, and then compressing to form the negative electrode mixture layer 41 on both sides of the negative electrode current collector 40.

The negative electrode active material is not particularly limited as long as it can reversibly intercalate and deintercalate lithium ions, and a carbon material such as graphite is generally used. The graphite may be any of natural graphite such as flake graphite, lump graphite, and earth graphite and artificial graphite such as hump artificial graphite and graphitized mesophase carbon microbeads. In addition, as the negative electrode active material, metals such as Si and Sn that are alloyed with Li, metal compounds including Si and Sn, and lithium titanium composite oxides may be used. The Si-containing compound represented by $SiO_x$ ($0.5 \le x \le 1.6$) may be used in combination with a carbon material such as graphite.

As a binder included in the negative electrode mixture layer 41, fluorine-containing resin such as PTFE and PVdF, PAN, polyimide, acrylic resin, and polyolefins may be used as in the case of the positive electrode 11, but styrene-butadiene rubber (SBR) is preferably used. The negative electrode mixture layer 41 may include CMC or a salt thereof, polyacrylic acid (PAA) or a salt thereof, PVA, or the like. The negative electrode mixture layer 41 includes, for example, SBR and CMC or a salt thereof.

The negative electrode 12 may have a negative electrode semiconductor layer formed on substantially the entire surface of the negative electrode mixture layer 41. The negative electrode semiconductor layer is a surface layer having a higher resistance than the negative electrode mixture layer 41, and includes at least one selected from the group consisting of, for example, oxides, nitrides, carbides, and negative electrode active materials, and a binder. The resistance value of a small short circuit may be increased for suppressing a leakage current, and therefore a surface layer having a large resistance value formed on the negative electrode has the same effect as forming a surface layer on the positive electrode.

Separator

As a separator 13, a porous sheet having ion permeability and insulating property is used. Specific examples of the porous sheet include a microporous thin film, a woven fabric, and a non-woven fabric. As the material of the separator, polyolefins such as polyethylene and polypropylene, cellulose, and the like are suitable. The separator 13 may have a single-layer structure or a laminated structure. In addition, on the surface of the separator 13, a resin layer having high heat resistance such as an aramid resin or a filler layer including a filler of an inorganic compound may be provided.

EXAMPLES

Hereinafter, the present disclosure will be further described with reference to examples, but the present disclosure is not limited to these examples.

Example 1

Production of Positive Electrode

A lithium-containing transition metal composite oxide represented by $LiNi_{0.5}Co_{0.2}Mn_{0.3}O_2$ was used as a positive electrode active material. The positive electrode active material, polyvinylidene fluoride (PVdF), and acetylene black (AB) were mixed at a solid content mass ratio of 96.5:1.5:2.0 to prepare a positive electrode mixture slurry with N-methyl-2-pyrrolidone (NMP) as a dispersion medium. The positive electrode mixture slurry was applied on both sides of a positive electrode current collector and the coating film was dried to form a positive electrode mixture layer (uncompressed state).

The positive electrode active material, PVdF, and AB were mixed at a solid content mass ratio of 97.5:1.5:1.0 to prepare a slurry for a semiconductor layer with N-methyl-2-pyrrolidone (NMP) as a dispersion medium. The slurry for a semiconductor layer was applied on the surface of the positive electrode mixture layer and the coating film was dried to form a semiconductor layer over the entire surface of the positive electrode mixture layer. Thereafter, the positive electrode mixture layer and the semiconductor layer were compressed by using a roller, and the current collector was cut into a predetermined electrode size to produce a positive electrode. On one side of the positive electrode current collector, the thickness of the positive electrode mixture layer was 60 μm, and the thickness of the semiconductor layer was 8 μm.

Production of Negative Electrode

Graphite powder, sodium salt of CMC, and dispersion of SBR were mixed at a solid content mass ratio of 98:1:1 to prepare a negative electrode mixture slurry with water as a dispersion medium. Thereafter, the negative electrode mixture slurry was applied on both sides of the negative electrode current collector consisting of copper foil, the coating film was dried, and then compressed by using a roller to form a negative electrode mixture layer on both sides of the current collector. The current collector was cut into a predetermined electrode size to produce a negative electrode.

[Preparation of Non-Aqueous Electrolyte]

Ethylene carbonate (EC), ethyl methyl carbonate (EMC), and dimethyl carbonate (DMC) were mixed in a volume ratio of 3:3:4. $LiPF_6$ was dissolved in the mixed solvent so as to obtain a concentration of 1.2 mol/L to prepare a non-aqueous electrolyte.

Production of Battery

A tab was attached to the above positive electrode and the above negative electrode, respectively, and each of the electrodes was spirally wound via a separator and molded into a flat shape to produce a flat wound electrode assembly. The electrode assembly was inserted into an outer body consisting of an aluminum laminated sheet and vacuum dried at 105° C. for 2 hours, and then the above non-aqueous electrolyte solution was injected thereto and the opening of the outer body was sealed to produce a laminated battery.

Example 2

In the preparation of a slurry for the semiconductor layer, a positive electrode and a secondary battery were produced in the same manner as in Example 1 except that the solid content mass ratio of the positive electrode active material, PVdF, and AB was changed to 97.7:1.5:0.8. The thicknesses of the positive electrode mixture layer and the semiconductor layer were adjusted to be the same as the thickness of the positive electrode in Example 1.

Comparative Example 1

A positive electrode and a secondary battery were produced in the same manner as in Example 1 except that no semiconductor layer was formed. The thickness of the positive electrode mixture layer was adjusted to be the same as the thickness of the positive electrode mixture layer in Example 1.

Measurement of Resistance Value of Positive Electrode

The surface resistance of each of the positive electrodes in the examples and the comparative example was measured by a two-terminal method (25° C.) using an AP probe with a Loresta-GP manufactured by Mitsubishi Chemical Corporation. The values shown in Table 1 are relative values when the resistance value of the positive electrode in Comparative Example 1 is 1.

Evaluation of Rate of Occurrence of Small Short Circuit

The self-discharge for 5 days was evaluated for each of the 280 batteries in the examples and the comparative example. Assuming that a small short circuit occurred when the self-discharge amount exceeded the average +3σ, the number of batteries in which a small short circuit occurred was counted to calculate the rate of occurrence of small short circuit. Relative evaluation was performed in Examples 1 and 2 and Comparative Example 1, and the evaluation result was described as "Excellent", "Good", and "Poor" in ascending order of the rate of occurrence of small short circuit.

TABLE 1

|  | Example 1 | Example 2 | Comparative Example 1 |
|---|---|---|---|
| Surface Resistance of positive electrode | 2.5 | 8 | 1 |
| Rate of occurrence of small short circuit | Good | Excellent | Poor |

As can be seen from the results shown in Table 1, all of the secondary batteries in the examples are less likely to cause a small short circuit in the above evaluation as compared with the secondary batteries in Comparative Example 1.

REFERENCE SIGNS LIST 10 secondary battery
11 positive electrode
12 negative electrode
13 separator
14 electrode assembly
15 battery case
16 exterior can
17 sealing assembly
18, 19 insulating plate
20 positive electrode lead
21 negative electrode lead
22 projecting portion
23 bottom plate
24 lower vent member
25 insulating member
26 upper vent member
27 cap
28 gasket
30 positive electrode current collector
31 positive electrode mixture layer
32 positive electrode semiconductor layer
40 negative electrode current collector
41 negative electrode mixture layer.

The invention claimed is:
1. A secondary battery, comprising:
a positive electrode;
a negative electrode; and
a separator interposed between the positive electrode and the negative electrode, wherein
each of the positive electrode and the negative electrode has a current collector and a mixture layer formed on a surface of the current collector,
at least one of the positive electrode and the negative electrode has a semiconductor layer that is formed on substantially an entire surface of the mixture layer and that has a resistance larger than that of the mixture layer,
a thickness of the semiconductor layer is smaller than a thickness of the mixture layer, and
a main component of the semiconductor layer is one selected from the group consisting of an oxide, a nitride, and a carbide, and does not serve as an active material of the at least one of the positive electrode and the negative electrode.

2. The secondary battery according to claim 1, wherein the semiconductor layer includes at least one selected from the group consisting of an oxide, a nitride, a carbide, and an active material.

3. The secondary battery according to claim 1, wherein p1 the positive electrode has a positive electrode mixture layer including an active material, a binder, and a conductive agent, and
- the semiconductor layer is formed on substantially an entire surface of the positive electrode mixture layer.

4. The secondary battery according to claim 3, wherein the semiconductor layer includes the active material, the
- binder, and the conductive agent, and
- a content of the conductive agent in the semiconductor layer is lower than a content of the conductive agent in the positive electrode mixture layer.

5. The secondary battery according to claim 1, wherein a thickness ratio of the mixture layer to the semiconductor layer is 8:2 to 9.5:0.5.

* * * * *